UNITED STATES PATENT OFFICE.

WILLIAM WINSLOW CROOKER, OF EVERETT, MASSACHUSETTS, ASSIGNOR TO HENRY C. LITTLE, OF WEST NEWTON, MASSACHUSETTS.

METHOD OF REPAIRING CRACKS IN PATENT-LEATHER.

1,004,537.

Specification of Letters Patent. Patented Sept. 26, 1911.

No Drawing. Application filed October 12, 1910. Serial No. 586,703.

*To all whom it may concern:*

Be it known that I, WILLIAM WINSLOW CROOKER, of Everett, in the county of Middlesex and State of Massachusetts, have invented certain new and useful Improvements in Methods of Repairing Cracks in Patent-Leather, of which the following is a specification.

This invention relates to the operation of repairing cracks which form in patent leather parts of boot and shoe uppers after the upper has been lasted.

It is well known that the enamel of ordinary patent leather often cracks after the upper of which it forms a part has been lasted and given its final form. These cracks may be due to the shrinkage of the enamel, or to the stretching of the leather by the lasting process, or to both causes. They are sometimes accompanied by cracks in the grain surface of the leather, and my invention has for its object to enable the portion of the crack that is formed in the grain surface to be filled, and its edges rendered smooth, preparatory to the application of a second coat of enamel for the purpose of repairing the damage caused by cracking, the practice being to remove the enamel containing the crack and portions of the enamel at both sides of the crack, thereby denuding a strip of the grain surface of the leather, and then to apply a second coating to the denuded portion to restore the continuity of the enamel.

In carrying out my invention I denude the damaged portion of a patent leather part of a lasted boot or shoe upper, preferably by first rendering brittle the portion to be denuded, by applying a volatile solvent such as acetone thereto, and then rubbing off the brittleized enamel, by pressing it against the rapidly rotating cloth cover of a wheel having a yielding cushion or pad supporting the cloth cover. This operation removes the enamel down to the grain surface of the leather, without abrading said surface, because the yieldingly backed cloth cover, while an abradant of the brittleized enamel, is not an abradant of the grain surface of the leather. Then in case the denuded grain surface is cracked in continuation of a crack in the enamel coating, I press the cracked part of said surface against the cloth cover of a rapidly rotating wheel, said cover being backed by a yielding pad or cushion and saturated with a composition or paste, which is at once a gentle or slowly acting abradant of the edges of the crack in the grain surface, and a filler for said crack. Said paste is preferably composed of oleaginous matter such as tallow, lard, or a heavy viscous oil, a resin or gum, such as shellac, or pitch, which is soluble in the oleaginous matter, and a finely powdered abrasive material such as carborundum. These ingredients are proportioned to form a soft paste adapted to be spread on the cloth cover and to penetrate the same. A brief application of the cracked leather to the cloth cover thus treated, causes the cover and the paste carried thereby, to remove the raw projecting edges of the crack, thus leaving the cracked grain surface entirely smooth, a portion of the paste being at the same time forced into the crack completely filling the same flush with the grain surface of the leather and practically restoring the continuity of the grain surface, and preparing it for the second coating of enamel.

I claim:

The method of repairing deeply cracked patent leather, which consists in removing the cracked portion of the enamel thereby denuding the cracked portion of the grain surface, and then removing the raw edges of the grain surface at the sides of the crack by applying a moving yielding surface carrying an abrasive filler to the said denuded and cracked portion, whereby the crack is filled flush with the grain surface of the leather.

In testimony whereof I have affixed my signature, in presence of two witnesses.

WILLIAM WINSLOW CROOKER.

Witnesses:
C. F. BROWN,
P. W. PEZZETTI.